US010723252B2

(12) United States Patent
Price et al.

(10) Patent No.: US 10,723,252 B2
(45) Date of Patent: Jul. 28, 2020

(54) FLOOR MAT WITH INTEGRAL GROMMET

(71) Applicant: THERMOFLEX CORPORATION, Waukegan, IL (US)

(72) Inventors: Robert Price, Mettawa, IL (US); David Reband, Antioch, IL (US); Thomas Harter, Niles, IL (US); Robert M. Miller, Vernon Hills, IL (US)

(73) Assignee: THERMOFLEX CORPORATION, Waukegan, IL (US)

( * ) Notice: Subject to any disclaimer, the term of this patent is extended or adjusted under 35 U.S.C. 154(b) by 47 days.

(21) Appl. No.: 15/714,259

(22) Filed: Sep. 25, 2017

(65) Prior Publication Data

US 2019/0092205 A1    Mar. 28, 2019

(51) Int. Cl.
*B60N 3/04* (2006.01)

(52) U.S. Cl.
CPC ............. *B60N 3/046* (2013.01); *B60N 3/044* (2013.01)

(58) Field of Classification Search
CPC ................................ B60N 3/046; B60N 3/044
USPC ........................................................ 296/97.23
See application file for complete search history.

(56) References Cited

U.S. PATENT DOCUMENTS

| 5,836,048 A | 11/1998 | Rossman et al. |
| 6,497,003 B2 * | 12/2002 | Calabrese ............. B60N 3/046 16/4 |
| 6,757,945 B2 | 7/2004 | Shibuya et al. |
| 6,886,209 B2 | 5/2005 | Blum et al. |
| 7,546,661 B2 | 6/2009 | Connor, Jr. |
| 7,945,992 B2 | 5/2011 | Parisi et al. |
| 8,375,514 B2 | 2/2013 | Dendo |
| 8,402,605 B2 | 3/2013 | Courtin et al. |
| 8,756,758 B2 | 6/2014 | Dendo |
| 8,757,698 B1 * | 6/2014 | Rowland ................ B60N 3/046 296/97.23 |
| 8,991,006 B2 | 3/2015 | Masanek, Jr. |
| 9,016,756 B2 | 4/2015 | Goto et al. |
| 9,199,567 B1 | 12/2015 | Kaufman et al. |
| 9,340,136 B2 | 5/2016 | Masanek, Jr. |
| 9,340,137 B2 | 5/2016 | Masanek, Jr. et al. |
| 9,346,386 B2 | 5/2016 | Goto et al. |
| 9,517,712 B1 | 12/2016 | Masanek, Jr. et al. |
| 9,586,509 B2 | 3/2017 | Stroud et al. |
| 9,610,880 B2 | 4/2017 | Masanek, Jr. et al. |
| 9,669,745 B2 | 6/2017 | Machida et al. |
| 2008/0038502 A1 | 2/2008 | Blinstrub |

(Continued)

FOREIGN PATENT DOCUMENTS

JP    2014201178 A    10/2014
KR    10-1027950 B1    4/2011

*Primary Examiner* — Joseph D. Pape
*Assistant Examiner* — Dana D Ivey
(74) *Attorney, Agent, or Firm* — Greer, Burns & Crain, Ltd.

(57) ABSTRACT

A floor mat with integral grommet is provided for a vehicle having a floor with at least one upstanding post. The mat includes a core, an upper surface and an opposite lower surface, a grommet is integrally formed with the mat and contained between the upper surface and the lower surface. The grommet includes a grommet body having a first, upper edge and a second, lower edge, a post-engagement throughbore defined by the body. A flange extends radially outwardly from the body between the upper edge and the lower edge for engaging the mat core.

17 Claims, 7 Drawing Sheets

(56) References Cited

U.S. PATENT DOCUMENTS

| | | |
|---|---|---|
| 2013/0136899 A1* | 5/2013 | Milella, Jr. .......... B60N 3/048 |
| | | 428/172 |
| 2014/0068858 A1 | 3/2014 | Wambeke |
| 2016/0107353 A1 | 4/2016 | Poulakis |
| 2017/0036582 A1 | 2/2017 | MacNeil et al. |
| 2017/0057391 A1 | 3/2017 | Masanek, Jr. et al. |

* cited by examiner

FLOOR MAT WITH INTEGRAL GROMMET

BACKGROUND

The present invention relates generally to floor mats used for protecting underlying finished, unfinished floors or carpeting, and more specifically to floor mats used in passenger vehicles.

It is common to provide the floors of passenger vehicles with protective floor mats, used for protecting the original equipment carpeting from wear and dirt, and also for providing an easily removable protected surface for those vehicles having uncarpeted flooring. To prevent the mats from interfering with vehicle operation and to releasably secure them in position, various fastening techniques have been employed. One conventional floor mat fastening scheme is to secure vertical posts in the vehicle floor, either before or after the original equipment carpeting has been installed. The posts often have an irregular shape such as an enlarged head and narrow neck, or another shape for releasably and lockingly engaging a complementary grommet. The grommets are typically provided in multiple pieces, and are assembled on the mat by sandwiching the mat body between grommet components, about an opening in the mat which accommodates the post in the floor. Often the grommets define an opening that matingly and releasably engages the post, and in some cases includes a resilient or deformable portion for releasably locking the engagement between the post and grommet to more securely hold the mat in position in the vehicle. In other cases, the grommet opening has an irregular shape for releasably engaging a vertically-extending post formation.

In many cases, the grommet technology has become relatively complicated to assemble on the mat and costly to produce, requiring as many as five-to-six separate pieces, including the post assembly. Also, since many vehicle manufacturers specify the structure of the vendor-supplied grommets, grommet manufacturers are forced to create and maintain multiple tooling configurations for each vehicle manufacturer customer. Since the grommet manufacturer and the mat manufacturer are typically separate, there is also a requirement for coordination of the designs of the respective products by the separate vendors to meet vehicle manufacturer guidelines.

Thus, there is a need for an improved vehicle floor mat grommet configuration that is relatively simple in construction. There is also a need for an improved vehicle floor mat configuration that is readily adaptable to a variety of post attachment fastening technologies.

SUMMARY

The above-listed needs are met or exceeded by the present floor mat with an integral grommet. To facilitate insert molding and to promote bonding with the mat material, which is preferably a thermoplastic material suitable for injection molding, such as, Thermoplastic Elastomer (TPE) or other known thermoplastic materials, the present grommet is provided with a grommet body defining a post engagement throughbore, and a flange extending radially from the body. The grommet is made of a plastic material having a melting point greater than that of the surrounding mat so that it can withstand the insert molding process. In addition, the grommet is made of a plastic that is chemically compatible with the mat material so that they will bond together during the molding process.

In the preferred embodiment, the flange is located between upper and lower edges of the body. In addition, the flange is provided with at least one, and preferably a plurality of slots for enhancing the assimilation of the grommet into the TPE as the mat is formed and cooled. In the preferred embodiment, the flange has a radius approximately equal to a radius of the grommet body. Another feature of the present mat is that the region of the mat that engages the flange is vertically offset or stepped up from a mat base. Thus, upon engagement with the post in the vehicle floor, an upper margin of the post is generally flush with an upper margin of the stepped up region.

More specifically, a floor mat with integral grommet is provided for a vehicle having a floor with at least one upstanding post. The mat includes a core, an upper surface and an opposite lower surface, a grommet is integrally formed with the mat and contained between the upper surface and the lower surface. The grommet includes a grommet body having a first, upper edge and a second, lower edge, a post-engagement throughbore defined by the body. A flange extends radially outwardly from the body between the upper edge and the lower edge for engaging the mat core.

In another embodiment, a floor mat is provided for a vehicle having a floor with at least one upstanding post. The mat has a core, an upper surface and an opposite lower surface, and a grommet integrally formed with the mat and contained between the upper surface and the lower surface. Included in the grommet are a grommet body having a first, upper edge and a second, lower edge, a post engagement throughbore defined by the body, and a flange extending radially outwardly from the body approximately midway between the upper edge and the lower edge, the flange having a plurality of slots constructed and arranged for receiving material of the mat core for enhanced fastening of the grommet in the mat core.

In still another embodiment, a floor mat is provided for a vehicle having a floor with at least one upstanding post. The mat has a core, an upper surface and an opposite lower surface, and a grommet integrally formed with the mat and contained between the upper surface and the lower surface. Included in the grommet are a grommet body having a first, upper edge and a second, lower edge, a post engagement throughbore defined by the body, and a flange extending radially outwardly from the body between the upper edge and the lower edge. The mat includes a vertically offset portion engaging the flange, and an upper margin of the post is generally flush with an upper margin of the vertically offset portion.

DETAILED DESCRIPTION

Figure 1:
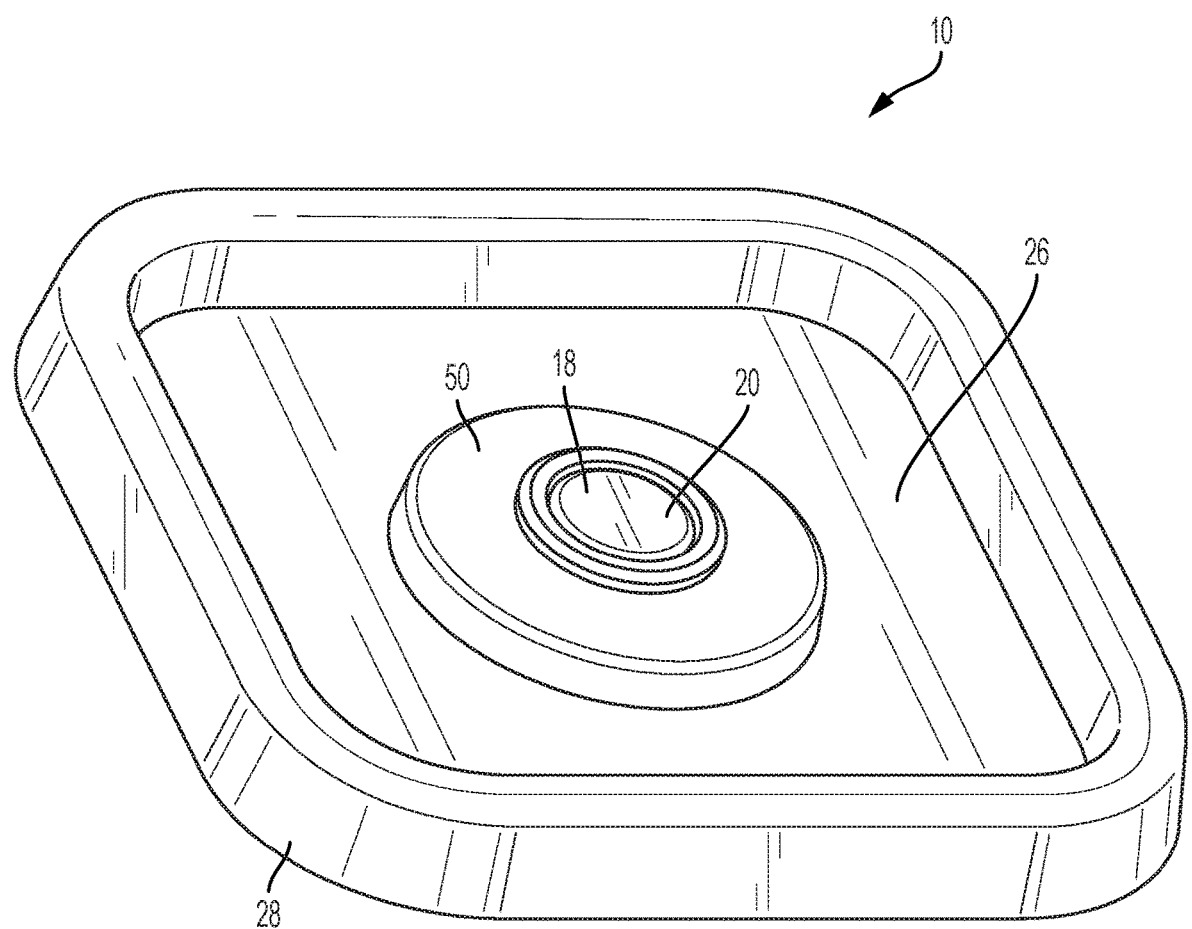
FIG. 1 is a top perspective view of a stylized or schematic floor mat equipped with the present grommet and engaged on a post in the vehicle floor.

Referring now to FIGS. 1-4, the present floor mat is generally designated 10, and is constructed and arranged for removable installation on a vehicle floor 12 having at least one post 14 secured thereto. Included on the post 14 is a flange 16 and a vertically projecting head 18 having an upper surface 20 and a diametrically narrowed neck 22. In some cases, the post 14 is secured to the vehicle floor 12 by chemical adhesive or the like applied to the flange 16. In other cases, the post is secured by a depending threaded spike portion (not shown) that threadably engages a hole in the vehicle floor 12. In most cases, the post 14 is made of durable plastic, however other self-supporting durable materials are contemplated, including but not limited to metals and engineered materials.

It should be understood that the mat 10 as depicted in FIG. 1 is shown having a rectangular shape, however this is for illustration only, and as is well known in the art, floor mats for vehicles are dimensioned to fit the floor pan of particular vehicles and have a variety of shapes. Included on the mat 10 is a core 24, an upper surface 26 which is contacted by the feet of the driver and/or passengers of the vehicle, and an opposite lower surface 28 which contacts the vehicle floor 12. As described above, the mat 10 is preferably made of injection molded plastic, such as thermoplastic or thermoset materials which are well known in the art, and more preferably Thermoplastic Elastomer (TPE) using a variety of plastic materials as is well known in the art. Thermoplastic materials, thermoset materials and TPE's are selected for moldability, flexibility, color retention, appearance and durability, among other properties.

A main feature of the present mat 10 is the integral formation of a grommet, generally designated 30, which is integrated within the mat and also contained between the upper surface 26 and the lower surface 28. Included in the grommet is a grommet body 32, which in the preferred embodiment is generally cylindrical, however other shapes are contemplated, including polygonal. The body 32 has a first, upper edge 34, a second, opposite, lower edge 36, an outer surface 38 and an inner surface 40 defining a post-engagement throughbore 42. A flange 44 extends radially outwardly from the grommet body 32, more specifically from the outer surface 38. It is preferred that the flange 44 is disposed between the upper edge 34 and the lower edge 36, and more preferably approximately midway between the edges 34, 36.

An important purpose of the flange 44 is providing an anchor location for engaging the mat core 24, as the mat is molded around the grommet 30. As such, the grommet 30 is preferably made of a plastic material having a higher melting point than the material of the mat 10, such as TPE described above. Thus, the grommet 30 will withstand the injection of molten plastic during the molding process and will retain its structural integrity.

Figure 2:
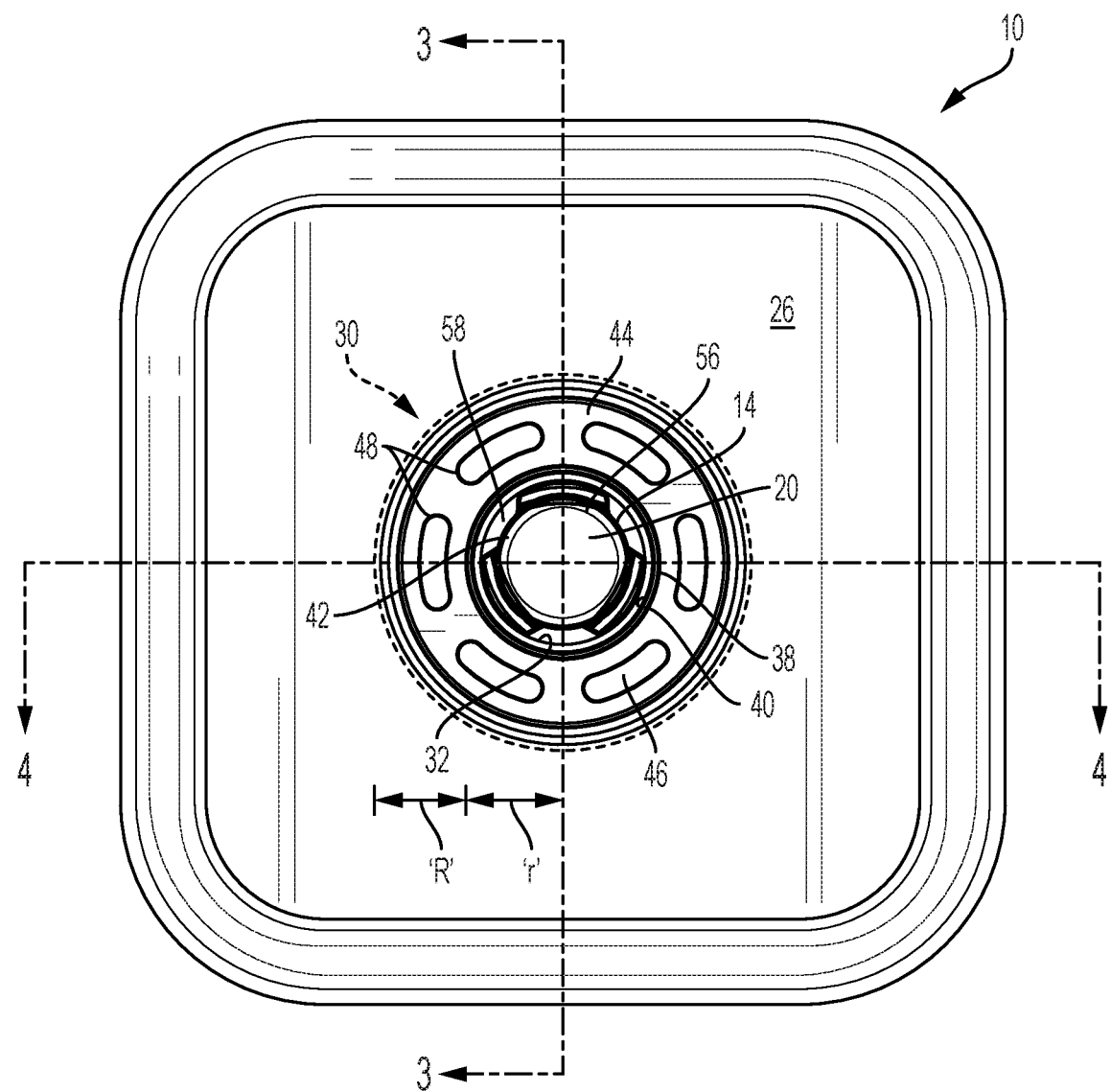
FIG. 2 is a top plan view of the mat of FIG. 1.
Figure 4:
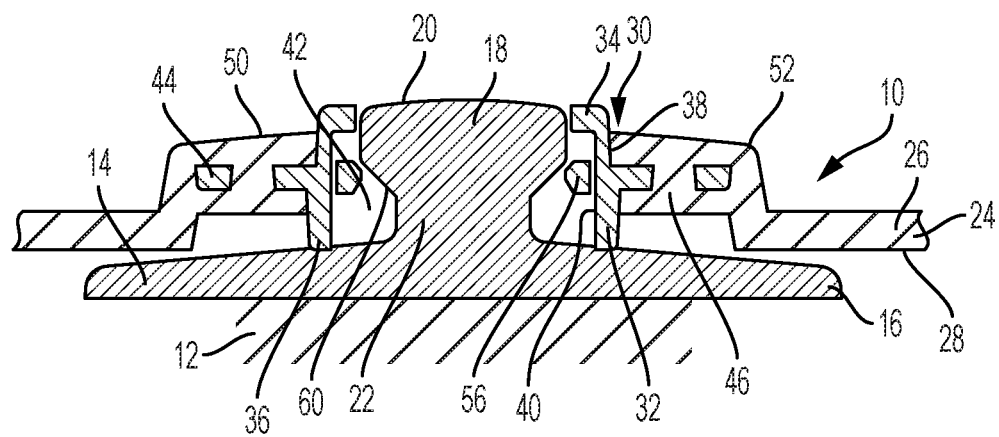
FIG. 4 is a vertical cross-section taken along the line 4-4 of FIG. 2 and in the direction generally indicated.

Referring now to FIGS. 2 and 4, a feature of the flange 44 is that it is provided with at least one, and preferably a plurality of slots 46. The slots 46 are open from top to bottom on the flange 44, and allow molten plastic that forms the mat 10 to flow through. Once the plastic sets and hardens, the flange 44, and the grommet 30 as well, are securely embedded and integrated into the core 24. As such, the slots 46 enhance the fastening of the grommet 30 to the mat core 24. As seen in FIG. 2, the slots 46 are preferably elongate in shape with radiused ends 48 generally forming an elongate oval shape, and are preferably arranged in end-to-end format on the flange 44. Portions of the flange 44 separate adjacent slots 46. Another feature of the flange 44 is that it has a radius "R" which is approximately equal to a radius "r" of the grommet body 32.

Figure 3:
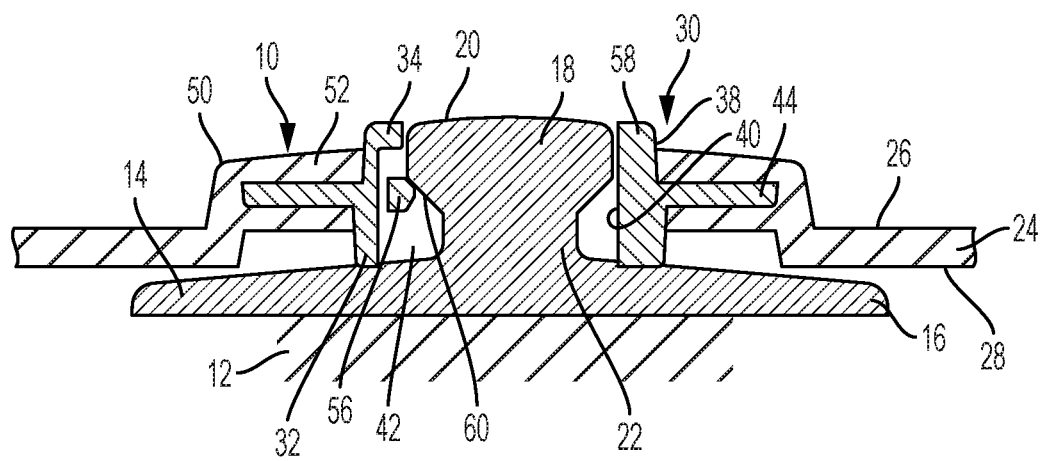
FIG. 3 is a vertical cross-section taken along the line 3-3 of FIG. 2 and in the direction generally indicated.

Referring now to FIGS. 1, 3 and 4, another feature of the present mat 10 is that it includes a vertically offset portion 50 that engages and contains the flange 44. The vertically offset portion 50 projects vertically from the upper surface 26 and surrounds the head 18 of the post 14. When viewed from above, as in FIGS. 1 and 2, the portion 50 is generally circular, however other shapes are contemplated. In the preferred embodiment, the vertically offset portion 50 has an upper margin or top surface 52 that is generally flush with the upper surface 20 of the post head 18.

Referring now to FIGS. 2-4, it is preferred that the present grommet 30 is provided with a structure on the inner surface 40, projecting in the post-engagement throughbore, for releasably lockingly engaging the post 14. This structure is contemplated as varying from manufacturer to manufacturer, to meet respective post specifications. In one embodiment, the grommet 30 includes at least one resilient, rib-like member 56, connected at respective ends to generally vertically-projecting blocks 58. As seen in FIGS. 3 and 4, the rib-like members 56 engage an underside 60 of the post head 18 for preventing inadvertent upward movement of the mat 10 relative to the post 14.

Referring now to FIGS. 5-10, another embodiment of the grommet for use with the present mat 10 is generally designated 70. Components shared with the grommet 30 are designated with identical reference numbers. Also, the grommet 70 is constructed and arranged for being integrally formed with the mat 10, in the same manner as the grommet 30 described above.

A main distinction between the grommets 30 and 70 is that the latter features a generally horizontally-oriented rib 72 defining an elongate oval opening 74. This structure replaces the rib-like member 56 and the blocks 58 of the grommet 30. Further, this configuration is constructed and arranged for releasably lockingly engaging a post 76 having an elongate, oval head portion 78 and a relatively small-diameter neck.

Figure 5:
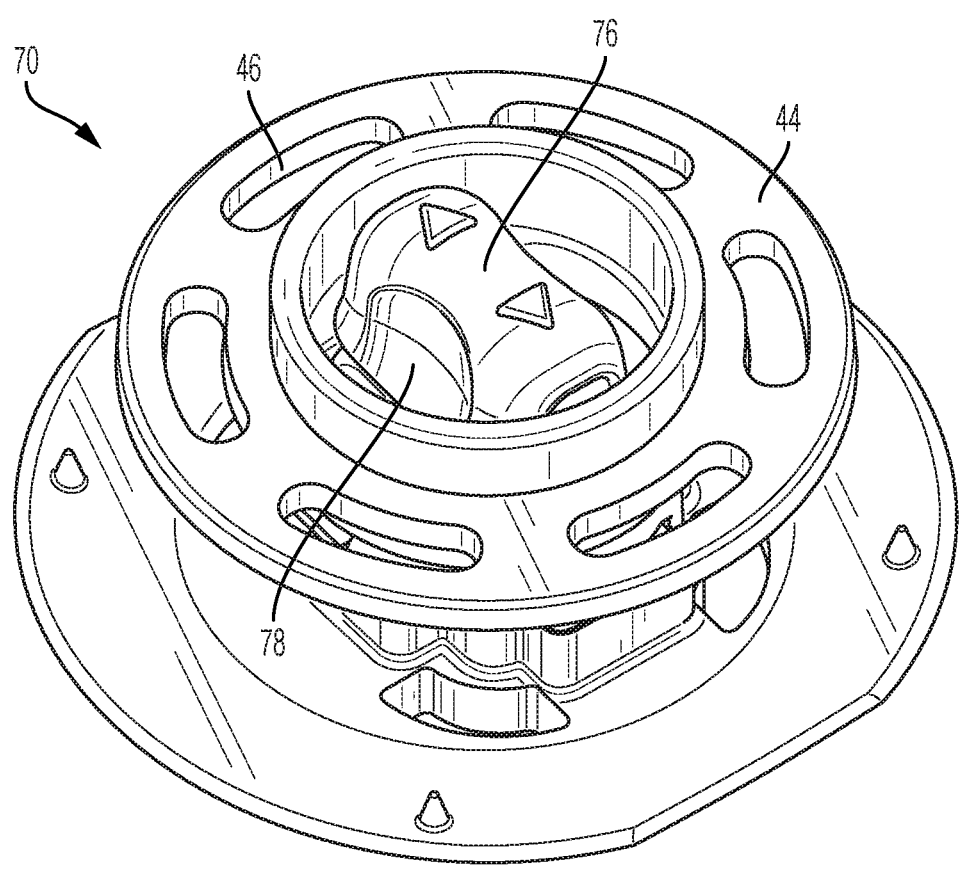
FIG. 5 is a top perspective of an alternate embodiment of the grommet assembly used with the present floor mat.
Figure 6:
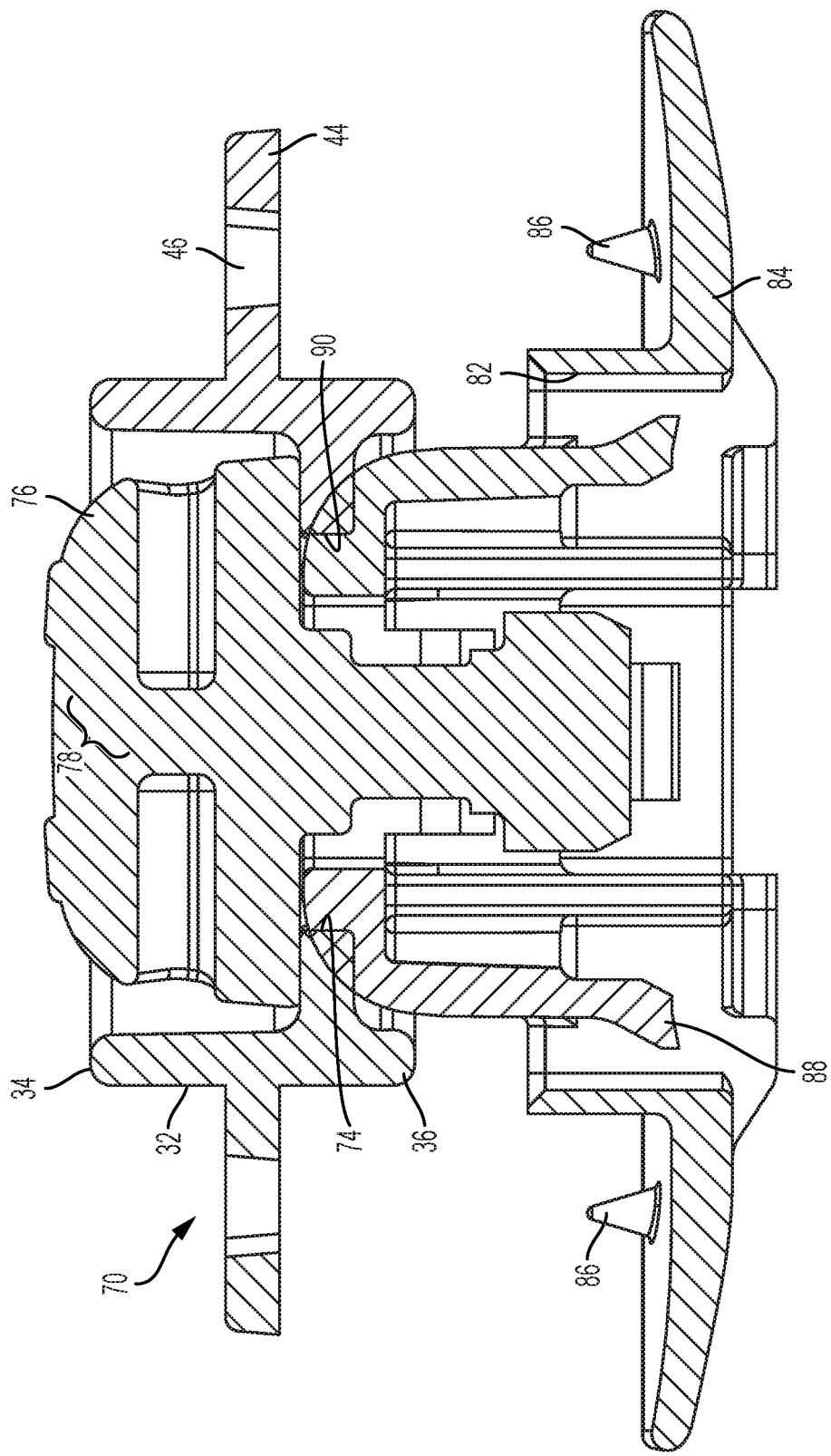
FIG. 6 is a cross-section taken along the lines 6-6 of FIG. 5 and in the direction generally indicated.
Figure 7:
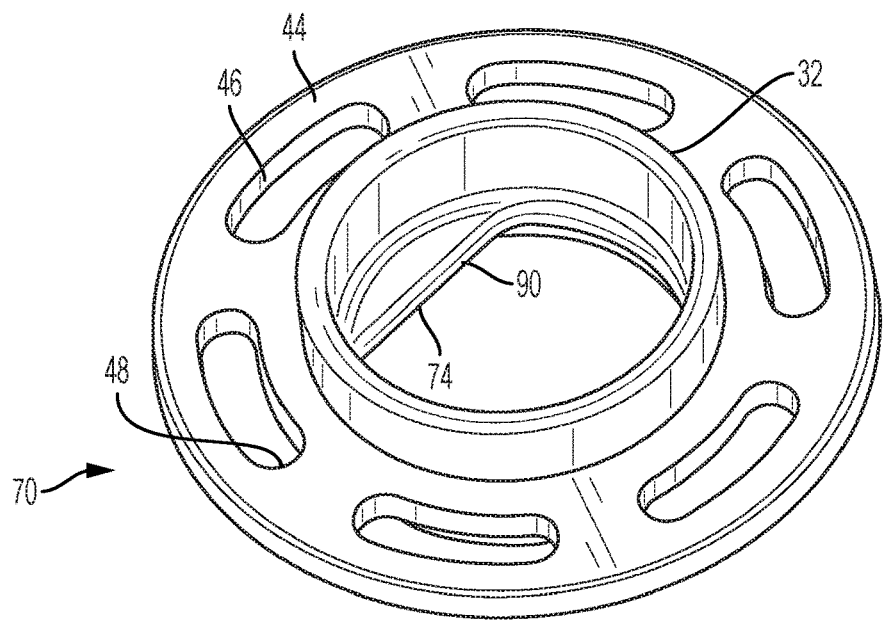
FIG. 7 is a top perspective view of the grommet used in the embodiment of FIG. 5.
Figure 8:
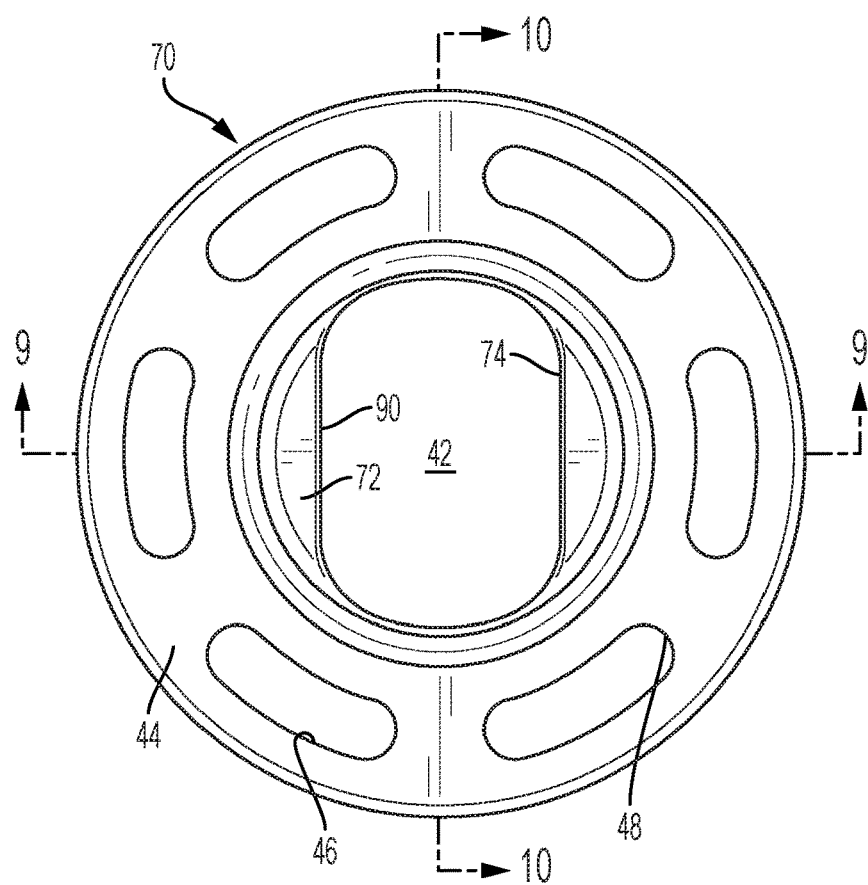
FIG. 8 is a top plan view of the grommet of FIG. 7.
Figure 9:
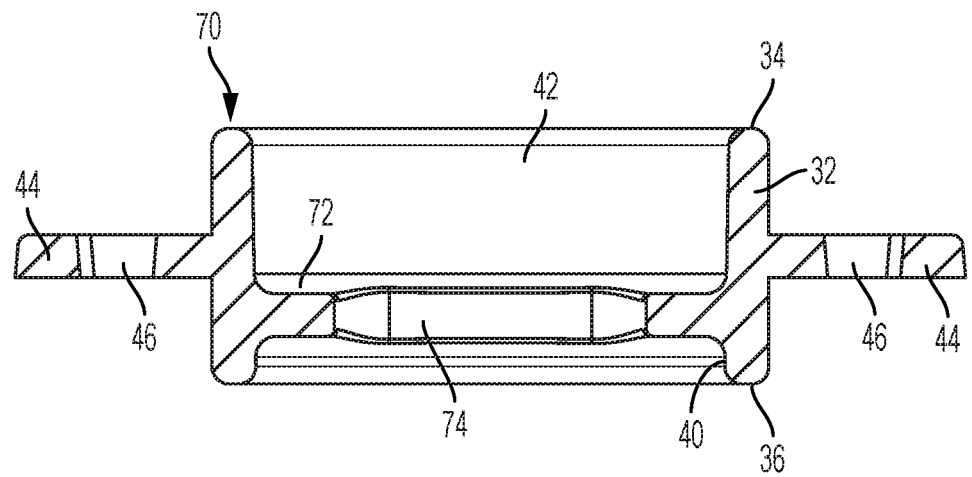
FIG. 9 is a cross-section taken along the line 9-9 of FIG. 8 and in the direction generally indicated.
Figure 10:
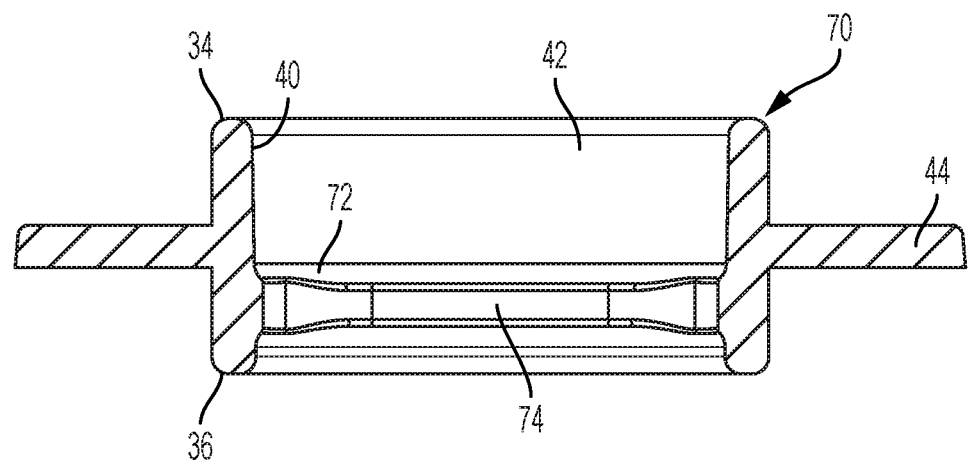
FIG. 10 is a cross-section taken along the line 10-10 of FIG. 8 and in the direction generally indicated.

Referring now to FIGS. 5 and 6, the post 76 rotates axially relative to an anchor piece 82 with a radially-projecting disk 84 having barbs 86 projecting vertically for engaging carpeting of the vehicle (not shown). A clamp 88 having an inverted bowl shape is snap fit relative to the anchor piece 82 and retains the post 76 in position relative to the anchor, but allows rotation of the post. In this embodiment, once the post 76, the anchor piece 82 and the clamp 88 are assembled on the vehicle carpet, the user rotates the head 78 so that alignment with the opening 74 in the grommet 70 is achieved, allowing the grommet to be easily fit over the post. Then, the user rotates the head 78 approximately ¼ turn or 90° so that the grommet 70, and the mat 10 are securely held in place in the vehicle via engagement of the head with a narrow portion the oval opening 74. It is contemplated that the present grommet 30, 70 may be modified on the inner surface 40 to accommodate other manufacturer-specified post configurations.

While a particular embodiment of the present floor mat with integral grommet has been described herein, it will be appreciated by those skilled in the art that changes and modifications may be made thereto without departing from the invention in its broader aspects and as set forth in the following claims.

The invention claimed is:

1. A floor mat for a vehicle having a floor with at least one upstanding post, said mat comprising:
   a core, an upper surface and an opposite lower surface;
   a grommet integrally formed with said mat and contained between said upper surface and said lower surface, said grommet including:
   a grommet body having a first, upper edge and a second, lower edge;
   a post-engagement throughbore defined by said body;
   a flange extending radially outwardly from said body between said upper edge and said lower edge, said flange providing an anchor location engaging said mat core as said mat is molded around said grommet.

2. The floor mat of claim 1, further including at least one slot constructed and arranged for receiving material of the mat core for enhanced fastening of said grommet in said mat core.

3. The floor mat of claim 1, wherein said flange has a plurality of said at least one slot, arranged end-to-end on said flange.

4. The floor mat of claim 2, wherein each said at least one slot is provided in the shape of an elongate oval.

5. The floor mat of claim 1, wherein said flange has a radius approximately equal to a radius of said grommet body.

6. The floor mat of claim 1, wherein said mat is made of thermoplastic material, and said grommet is made of a plastic material with a higher melting point than said thermoplastic material of said mat.

7. The floor mat of claim 6, wherein said mat is made of TPE.

8. The floor mate of claim 6, wherein said mat is made of thermoset or thermoplastic material.

9. The floor mat of claim 1, wherein said mat includes a vertically offset portion engaging said flange.

10. The floor mat of claim 9, wherein an upper margin of the post is generally flush with said upper edge of said grommet body.

11. The floor mat of claim 1, wherein said flange extends from said grommet body approximately midway between said first and second edges.

12. The floor mat of claim 1, wherein an inner surface of said grommet body is provided with at least one resilient member for releasably lockingly engaging the post.

13. The floor mat of claim 1, wherein an inner surface of said grommet body is provided with a generally horizontally-oriented rib defining an elongate oval opening.

14. A floor mat for a vehicle having a floor with at least one upstanding post, said mat comprising:
   a core, an upper surface and an opposite lower surface;
   a grommet integrally formed with said mat and contained between said upper surface and said lower surface, said grommet including:
   a grommet body having a first, upper edge and a second, lower edge;
   a post-engagement throughbore defined by said body;
   a flange extending radially outwardly from said body approximately midway between said upper edge and said lower edge, said flange having a plurality of slots constructed and arranged for receiving material of the mat core for enhanced fastening of said grommet in said mat core as said mat is molded around said grommet.

15. The floor mat of claim 14, wherein said slots are arranged end-to-end on said flange.

16. The floor mat of claim 14, wherein each said at least one slot is provided in the shape of an elongate oval.

17. A floor mat for a vehicle having a floor with at least one upstanding post, said mat comprising:
   a core, an upper surface and an opposite lower surface;
   a grommet integrally formed with said mat and contained between said upper surface and said lower surface, said grommet including:
   a grommet body having a first, upper edge and a second, lower edge;
   a post-engagement throughbore defined by said body;
   a flange extending radially outwardly from said body between said upper edge and said lower edge, said flange providing an anchor location engaging said mat core as said mat is molded around said grommet; and
   said mat includes a vertically offset portion engaging said flange.

* * * * *